United States Patent [19]
Och

[11] Patent Number: 5,546,666
[45] Date of Patent: Aug. 20, 1996

[54] TOOTHING TESTING APPARATUS

[75] Inventor: Rudolf Och, Nürnberg, Germany

[73] Assignee: Frenco Verzahnungslehren GmbH, Germany

[21] Appl. No.: 281,564

[22] Filed: Jul. 28, 1994

[30] Foreign Application Priority Data

Aug. 6, 1993 [DE] Germany .......................... 43 26 406.9
May 30, 1994 [DE] Germany .......................... 44 18 829.3

[51] Int. Cl.⁶ .................................................. G01B 5/16
[52] U.S. Cl. .................. 33/501.7; 33/DIG. 14
[58] Field of Search ............................ 33/501.7, 501.8, 33/501.9, 501.11, 501.14, 501.17, 501.18, DIG. 14

[56] References Cited

U.S. PATENT DOCUMENTS

| | | | |
|---|---|---|---|
| 3,882,604 | 5/1975 | Macklyn | 33/DIG. 14 |
| 3,979,834 | 9/1976 | Brookfield | 33/501.18 |
| 4,517,743 | 5/1985 | Och | 33/501.11 X |
| 4,519,242 | 5/1985 | Höfler et al. | 33/501.9 X |

FOREIGN PATENT DOCUMENTS

| | | |
|---|---|---|
| 3327549A1 | 2/1985 | Germany . |
| 3109334C2 | 4/1988 | Germany . |
| 4035302A1 | 5/1992 | Germany . |
| 1325289 | 7/1987 | U.S.S.R. ............................ 33/501.17 |
| 1229373 | 4/1971 | United Kingdom ................. 33/501.3 |

OTHER PUBLICATIONS

Brochure of FRENCO Company entitled "Indicating Gages for Splines and Gears—Series V" (no date).
Brochure of FRENCO Company entitled "Indicating Spline Gages—Accessories" (no date).

Primary Examiner—William A. Cuchlinski, Jr
Assistant Examiner—G. Bradley Bennett
Attorney, Agent, or Firm—Bacon & Thomas

[57] ABSTRACT

A toothing testing apparatus includes at least one pair of measuring disks or balls of a certain diameter which are introducible into respective substantially diametrically opposed tooth spaces of a testpiece, and measuring probes each including a base part and a measuring part elastically secured to the base part and rockable relative thereto, for measuring the distance between the measuring disks or balls of said at least one pair, the measuring part having one of the measuring disks or balls attached thereto and the base part being housed in or against a stationary part of the testing apparatus. The measuring disks or balls are symmetrically positioned and automatically centered in the tooth spaces to be measured, and the depth of penetration of the measuring disks or balls into the tooth spaces is measured by the testing apparatus.

30 Claims, 10 Drawing Sheets

TOOTHING TESTING APPARATUS

BACKGROUND OF THE INVENTION

The invention relates to a toothing testing apparatus in which a disk or a ball (both sometimes hereinafter referred to as a "measuring ball" for the sake of simplicity) of a certain diameter is introducible into each of two tooth spaces lying roughly diametrically opposite each other in a testpiece having a toothing, and the distance of these two measuring balls from each other ("measure between or over two balls") is measured, wherein a measuring probe lies against each of the measuring balls, and wherein means are further provided with which the measuring ball in question is symmetrically positionable in the tooth space concerned. Measurement of the distances between the two flanks of a tooth space of a testpiece, particularly on the pitch circle of this toothing, is thus possible by conversion of the distances between the two measuring balls measured with such a tooth testing apparatus. Various apparatuses are known for this measurement, e.g. according to DE-PS 3109334. That arrangement does produce satisfactory measurement results. A drawback, however, is that it operates only mechanically and requires a relatively large amount of space, as probes in that arrangement extend virtually over the whole length of the testing apparatus.

DE-OS 4035302 discloses an internal toothing measuring device which operates with a mechanical deflection, but includes no guide toothing. Measurement requires a laborious actuation by hand, the measuring rollers having to be swivelled to and fro. DE-OS 3327549 discloses an automatic toothed-wheel testing apparatus in which two probes are used, each of which displays means in the form of an electrical, inductive measurement of the probe measurement path. Measuring balls lie in each case against a flank of neighbouring teeth, with which the pitch is measured. A "measure between or over two balls" is not measured.

Known from publications indicating Spline Gages (Series V) of the Applicant are internal and external toothing testing apparatuses in which the measuring probes do operate electrically, i.e., the detected "measure between or over two balls" is converted into electrical values. However, considerable space is required for such an apparatus and moreover, the apparatus is a relatively costly design.

Compared with the above, the task or problem posed for the invention is that of developing a testing apparatus in such a way that the "measure between or over two balls" can be measured with a much smaller space requirement than hitherto possible and which measurement can be converted into electrical values, and also in such a way that the symmetrical positioning in the toothing space concerned (so-called "floating") is achieved.

SUMMARY OF THE INVENTION

Accordingly, the present invention provides a toothing testing apparatus comprising: at least one pair of measuring members having a circular cross-section, such as disks or balls of a certain diameter, which are introducible into respective substantially diametrically opposed tooth spaces of a testpiece; measuring probes, comprising a base part and a measuring part elastically secured and which is rockable relative thereto, for measuring the distance between the measuring disks or balls of said at least one pair, the measuring part having a measuring disk or ball attached thereto and the base part being housed in or against a stationary part of the testing apparatus; means for symmetrically positioning the measuring disks or balls of said at least one pair in the tooth spaces to be measured, the measuring disks or balls being automatically centred in respective tooth spaces; and means for the electrical measurement of the depth of penetration of the measuring disks or balls into the tooth spaces.

Several advantages are obtained with the aforementioned arrangement. Such an arrangement, and in particular the small measuring probes, is or are housable in a body of such a testing apparatus practically without any additional space requirement. Also, the necessary symmetrical positioning of the tooth spaces concerned is provided by the automatic centring of the measuring balls.

Preferably, the base part is housed, oscillatingly about an axis which runs parallel to the longitudinal axis of the testing apparatus, in or against a stationary part, for example a bearing body of the testing apparatus, for the aforementioned centring. In order to save space, the small measuring probes can in each case be accommodated in a recess, running in the longitudinal direction of the toothing testing apparatus, of a bearing body.

Preferably, the base part is firmly attached to the toothing testing apparatus and the measuring part, in addition to its aforementioned rocking movement, is swivellable about an axis relative to the base part which is located in the plane of the rocking movement and runs roughly perpendicular to the longitudinal direction of the base part. The basic advantages of the invention which have already been explained are also realized in this preferred arrangement. There is a firm attachment to, and a corresponding holding of the base part at, the testing apparatus. The measuring part is swivellable about the explained axis relative to the base part for the centring of the measuring balls in the testpiece. This can be achieved easily and effectively in terms of design.

More preferably, the measuring part is articulated to the base part via a spring or spring arrangement which is elastically bendable, both in a rocking direction and in a swivel direction relative to the base part, the swivel direction running in the plane of the base part about an axis perpendicular to the plane of the base part and being located in the plane of the rocking movement. This arrangement provides both the rocking movement and also the aforementioned swivel movement between measuring part and base part with one and the same elastic component. The spring action guarantees the automatic return of the measuring part into the starting position as soon as measurement is ended.

The aforementioned concept of the longitudinal direction which is parallel to the longitudinal axis of the testing apparatus is understood to be the direction in which the teeth and tooth spaces or projections of a guide toothing of the testing apparatus corresponding to these, and thus also the teeth and tooth spaces of the testpiece, run. The testpiece is shifted in the aforementioned longitudinal direction with its toothing in or over the toothing or the like of the testing apparatus, depending on whether it is the external toothing or the internal toothing of a testpiece which is being tested. The oscillating housing of the base part of the small measuring probe or the swivellable arrangement of the measuring part relative to the base part also require no additional space, as the embodiments described hereinbelow will show. Because of these arrangements of the invention, the measuring ball attached on the rocker of the small measuring probe reaches, in centring manner, the necessary symmetrical position between and against the flanks of the tooth space to be measured of itself, i.e. on its own. This applies to both small measuring probes lying diametrically opposite each other. The resultant depth of penetration of both measuring balls is detected inductively and thus converted immediately into electrical measurement values.

With the use and the arrangement of such small measuring probes, the invention makes it possible to satisfy all the essential requirements as regards the "measurement over or between two balls" in the case of such a toothing testing apparatus. It is of further advantage that when such a toothing testing apparatus is developed with several small measuring probes, e.g. 3×2 small measuring probes which are distributed symmetrically over the circumference of the bearing body, there is no perceptible increase in space requirement.

Preferably, the testing apparatus further comprises an adjustment element displaceable by the testpiece in a fitting-on direction in which the testpiece is fittable over or into the guide toothing, the fitting-on direction being parallel to the longitudinal axis of the testing apparatus, and there being provided subsequent to the adjustment element electrical measuring devices which, given a corresponding slide position of the adjustment element, are actuated by the latter, and with which the displacement position of the testpiece relative to the guide toothing is ascertainable. This preferred arrangement makes it possible to perform the measurement of the "measure over or between two balls" at any desired points lying one behind the other in longitudinal direction of the toothing of the testpiece. In this way, the size of the "measure over or between two balls" at different points of its toothing distributed over the longitudinal direction of the testpiece is precisely ascertainable.

More preferably, the adjustment element comprises a sleeve with cone grooves tapering slightly conically in the displacement and adjustment direction, and the electrical measuring devices comprise two further measuring probes, each of which have a further rocker and a further measuring ball, wherein the further measuring probes, considered in the fitting-on direction, are located behind the sleeve and are so positioned in radial direction perpendicular to the longitudinal axis that the further rockers with the further measuring balls of each further measuring probe come to rest against the cone grooves of the adjustment element. With this arrangement the position of the measuring points in longitudinal direction of the toothing is likewise detected by small measuring probes and converted into electrical values, the aforementioned small measuring probes corresponding to the small measuring probes for detection of the "measure over or between two balls". The use of such small measuring probes for different measuring tasks not only rationalizes production, but also has the advantage that both measured values, namely "measure over or between two balls" and the position of the measuring point in question in the longitudinal direction of the toothing, can be electrically detected in the same way and coordinated for their presentation.

BRIEF DESCRIPTION OF THE DRAWINGS

Preferred embodiments of the present invention will be described hereinbelow by way of example only with reference to the accompanying drawings, in which.

DETAILED DESCRIPTION OF THE PREFERRED EMBODIMENTS

Figure 1:
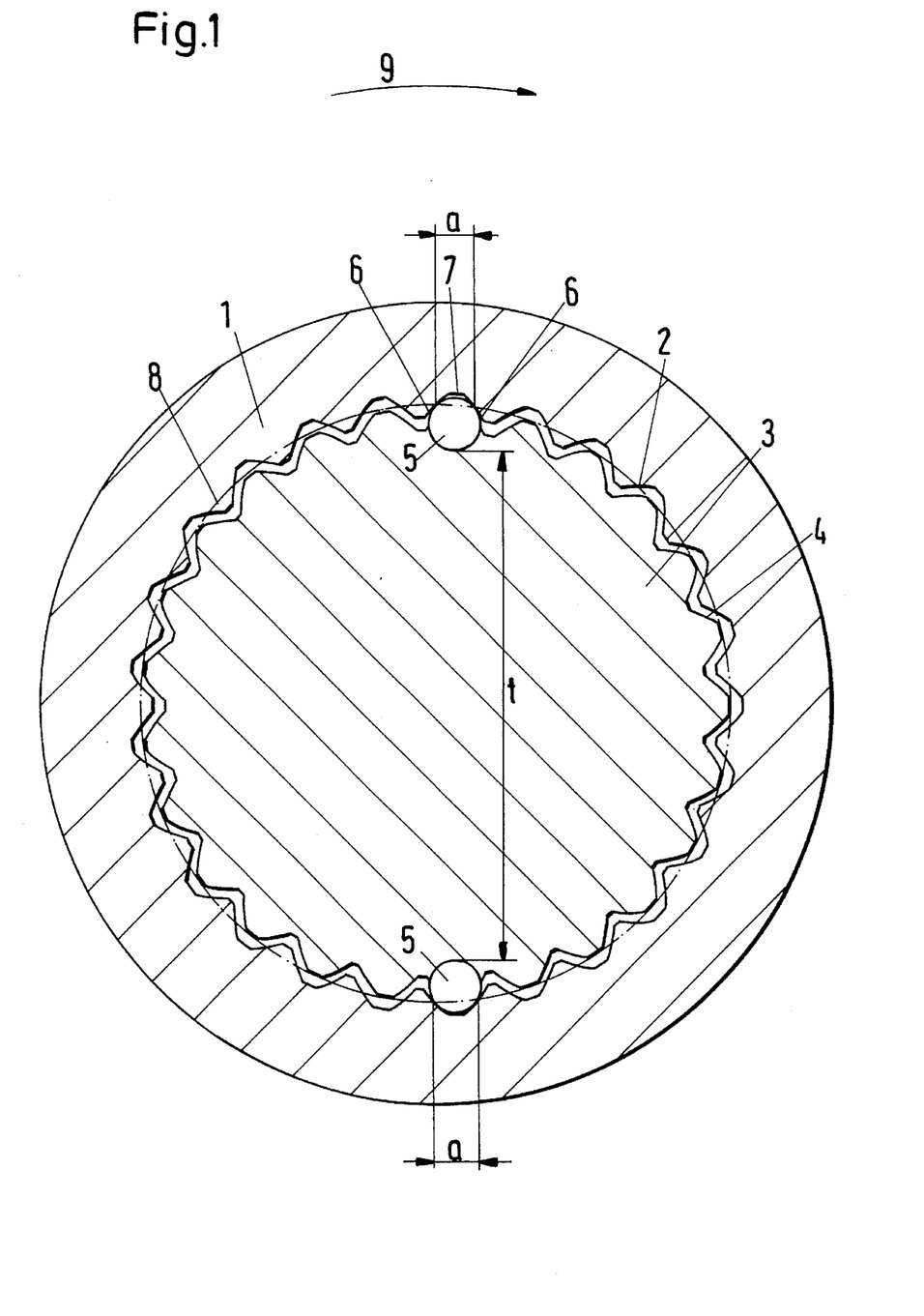
FIG. 1 illustrates a cross-section through a testpiece with internal toothing and a test device with external toothing.

FIG. 1 shows a testpiece I with internal toothing 2 and a testing device comprising a sleeve 3 with external toothing 4 and two measuring balls 5. The aim is to measure the distances a between the two flanks 6 of tooth spaces 7 of the testpiece 1, in particular on the pitch circle diameter 8 of the testpiece 1. The two measuring balls 5, precisely profabricated in their diameter, are introduced into two tooth spaces 7 lying diametrically opposite each other (described in detail hereinbelow). The distance t (the "distance between two balls") is measured by a means which is not illustrated. The distances a in the tooth spaces can be deduced directly from the measurement result t. These measurements are known per se. The measurements are carried out at least for two tooth spaces lying diametrically opposite each other in a testpiece. Further measurements are preferably also made at tooth space pairs offset in the circumferential direction 9 by suitable degrees of angle. Both testpieces with internal toothing (FIGS. 2, 3 and 6) and with external toothing (FIGS. 7 to 9) are measurable, The following description of the embodiments illustrated in FIGS. 2 to 6 also applies in principle to the embodiment illustrated in FIGS. 7 to 9.

Figure 2:
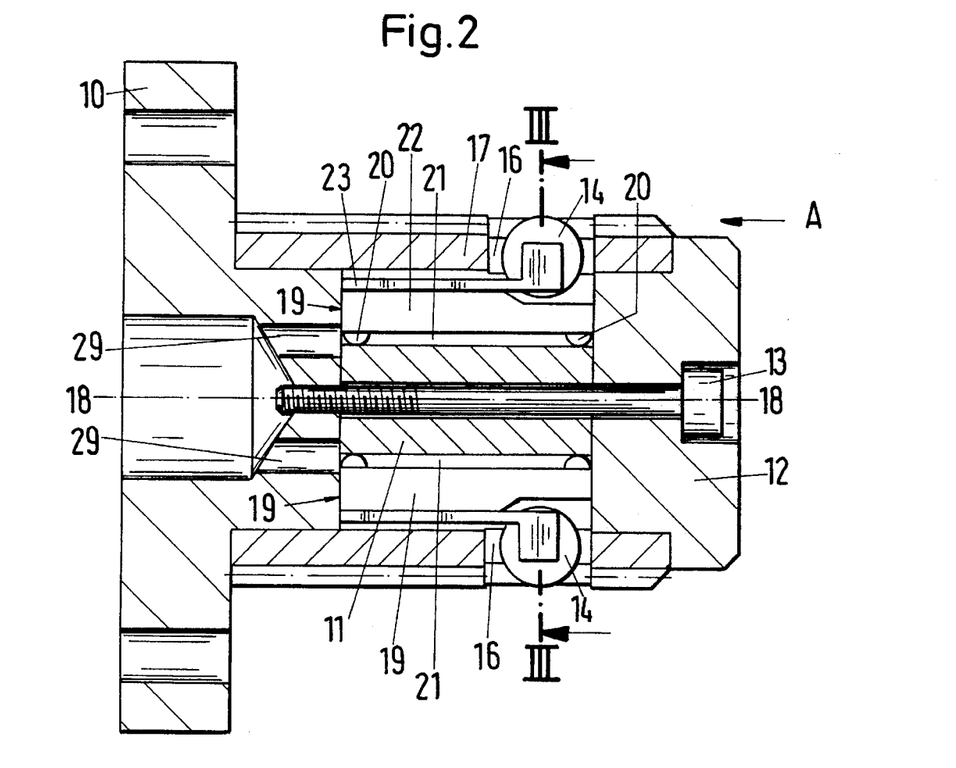
FIG. 2 illustrates a longitudinal section through a first embodiment of a testing apparatus in accordance with the present invention for the measurement of an internal toothing.
Figure 3:
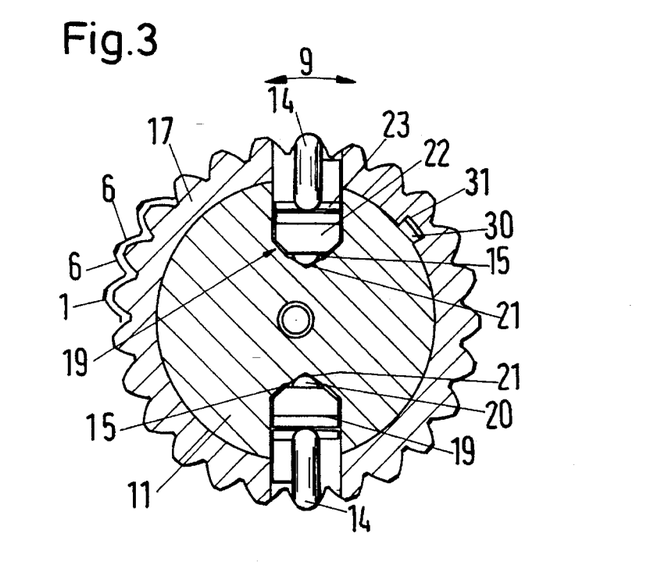
FIG. 3 illustrates a section along line III—III in FIG. 2.

FIG. 2 shows a preferred embodiment of the invention comprising a base body 10, a bearing body 11 and a centring disk 12 which are held together by means of a screw coupling. The bearing body 11 is thus stationary relative to the testing apparatus, i.e., not twistable or displaceable relative to it. The bearing body 11 provides for the accommodation or attachment of small measuring probes 19 whose structure is more fully illustrated in FIGS. 4 and 5. FIGS. 2 and 3 show two small measuring probes 19 which are located diametrically opposite each other in correspondingly positioned recesses 15 running in the longitudinal direction of the bearing body 11. The measuring probes 19 project outwards with so-called radius disks 14, which have the function of measuring balls, through openings 16 of a guide toothing 17. The recesses 15 preferably comprise a continuous groove extending over the length of the bearing body. The guide toothing has the function of a guide body, and in this embodiment is a toothing sleeve 17 which is held firmly between the centring disk 12 and the base body 10 by the screw coupling 13. The aforementioned longitudinal direction runs in the direction of, or parallel to, the central longitudinal axis 18—18 of the testing apparatus and thus of the aforementioned components 10 to 13 and 17. The recesses 15 thus also run parallel to the longitudinal direction 18—18.

Since (see FIG. 3) the measuring devices, which are in the form of small measuring probes 19, lie diametrically opposite each other, tooth spaces 7 lying diametrically opposite each other (see FIG. 1) in a testpiece can be surveyed.

Referring to FIG. 3, the small measuring probes 19 are housed oscillatingly in the recesses 15 around bearing tips or balls 20 in the circumferential direction 9. The bearing tips or balls 20 are located in a respective bearing channel 21, tapering roughly in wedge form in its cross-section, which is provided in the base of the recesses 15 and which runs in the aforementioned longitudinal direction. This makes it possible for the measuring balls 14 (in this embodiment radius disks) to enter the tooth spaces 7 and "float" to a certain extent. That is, provide a certain lateral mobility (in circumferential direction 9) in such a way the measuring balls 14 are centrally located in the respective tooth spaces and thus lie symmetrically against the two tooth flanks 6. The two bearing tips or balls 20 lie one behind the other at a distance from each other in the longitudinal direction 18—18, and in the centre of the base surface area of the base part 22.

Figure 4:
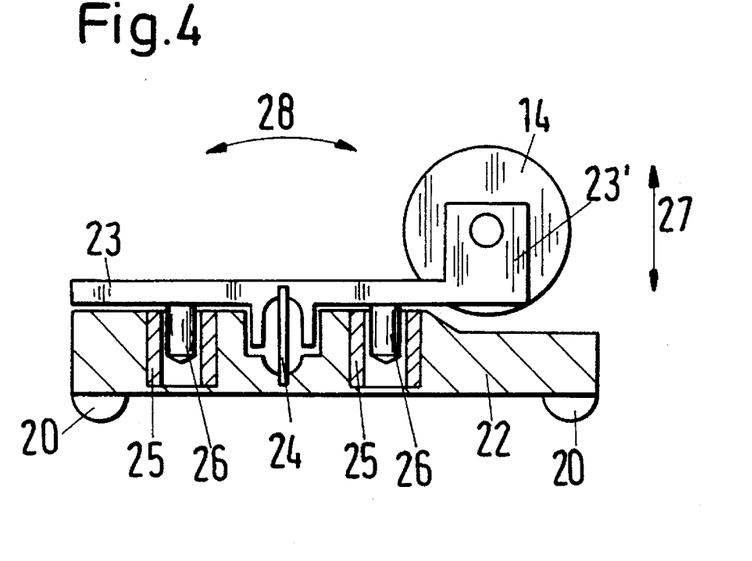
FIG. 4 illustrates a small measuring probe (in enlarged scale as compared to the other Figures)
Figure 5:
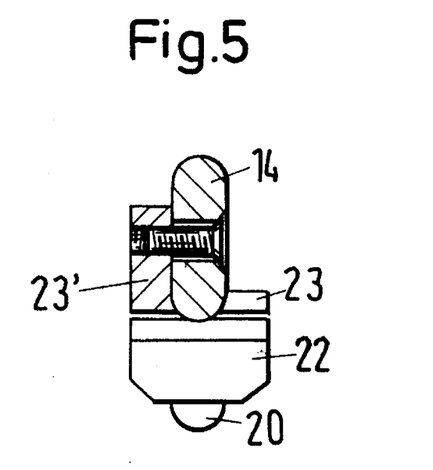
FIG. 5 illustrates a front view of the probe shown in FIG. 4 (shown to the same scale as FIG. 4)

Referring to FIGS. 4 and 5, the small measuring probes 19 consist of a base part 22 and a measuring part 23 designed as a rocker which are connected to each other in rocking-articulated manner, i.e., rockable to and fro relative to one another. For this purpose, each small measuring probe 19 includes a membrane 24 made from an elastically resilient material, in particular metal. This membrane 24 is connected at its two ends to the base part and to the measuring part, respectively. Each base part 22 bears centrally at its undersurface the bearing tips or balls 20 which engage in the channels 21 and make possible the oscillation of the small measuring probes 19 in a peripheral direction 9 about the bearing channel 21. The top side of each base part 22 is also provided with a coil 25 into which magnet cores 26 located on the underside of the measuring part 23 can penetrate. Depending on how far the radius disk 14, which is attached to one arm 23' of the measuring part 23, moves in the direction 27 inside the respective tooth space 7, either the left-hand or the right-hand magnet core 26 penetrates the associated coil 25. The measuring part 23 describes a rocking movement roughly in the direction of the arrows 28. The up-and-down movement of the two measuring balls or disks 14 in arrow direction 27 results from the depth of penetration of the balls or disks 14 into the associated tooth spaces 7. The resultant depths of penetration of the magnet cores 26 into the coils 25 produce, by the inductive route, electrical values which allow the distance t and thus the size a to be determined (as described hereinabove in relation to FIG. 1).

The guide tooth arrangement ensures that the testpiece 1 fitted over it (see FIG. 3) cannot tilt significantly about the longitudinal axis 18—18. As the two measuring balls 14 in the guide tooth arrangement are provided on the same cross-sectional plane of the bearing body 11, and as the aforementioned arrangement prevents too great a tilting or wobbling of the testpiece, it is thus ensured that the two measuring balls 14 of a measuring ball pair are located sufficiently accurately in a cross-sectional plane of the testpiece running perpendicular to the longitudinal direction 18—18. Measurement errors which could occur as a result of the two measuring balls in each guide tooth arrangement being in a cross-sectional plane of the testpiece which does not run at a right angle to its longitudinal axis are thus prevented.

Figure 15:
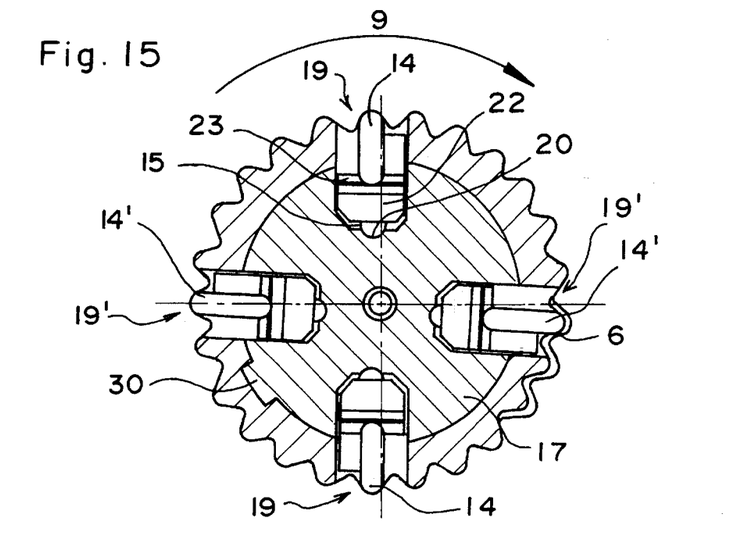
FIG. 15 illustrates a section corresponding to the section illustrated in FIG. 3, but in which additional measuring probes and test balls have been added.

Preferably, several pairs of measuring balls are provided. For example, as shown in FIG. 15, in addition to the pair of measuring balls shown in FIG. 3, two further pairs of probes 19' and measuring balls 14' can be provided which are offset by 60 and 120 degrees respectively vis-à-vis the drawn-in pair of measuring balls in the circumference 9.

Openings 29 are provided for the guiding through of electrical lines which come from the inductive detector 25,26 provided for detecting the rocking position of the measuring part 23, and lead to a display and/or evaluation device.

The angle position of the guide toothing 17 relative to the bearing body 11 in the circumferential direction 9 is fixed by engagement of a projection 30 on the bearing body 11 in a recess or groove 31 in the guide toothing 17.

Figure 6:
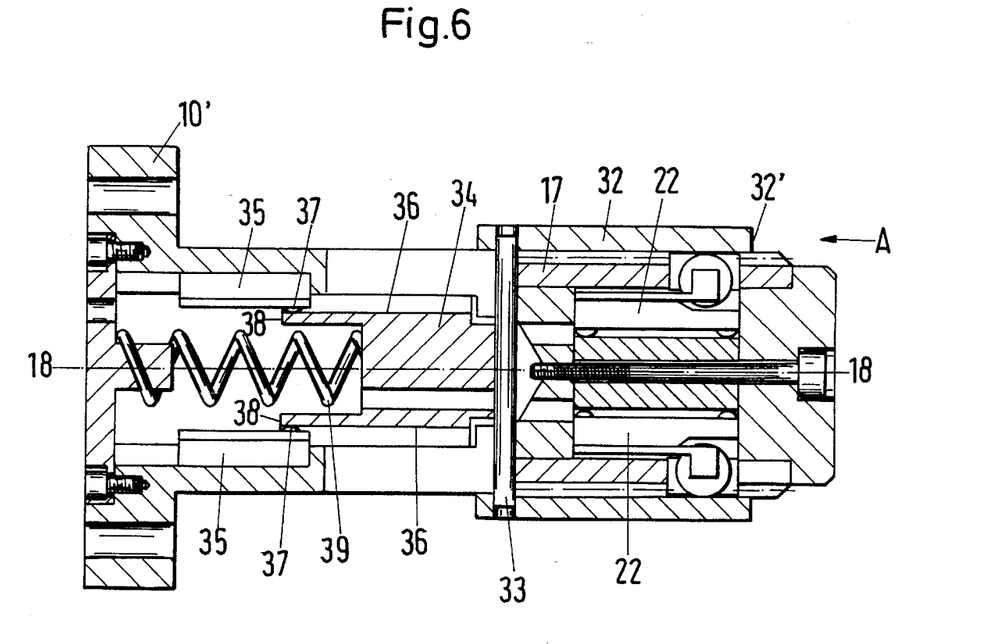
FIG. 6 illustrates a testing apparatus in accordance with another embodiment of the present invention, this embodiment being a modification of that embodiment shown in FIGS. 2 and 3 to carry out longitudinal dynamic measurements.

FIG. 6 illustrates a further embodiment of a testing apparatus in accordance with the present invention. This apparatus is a modification of the apparatus illustrated in FIGS. 2 and 3 for the measurement of the internal toothing of a testpiece 1, and provides for longitudinally dynamic measurement. As in the embodiment shown in FIG. 2, the testpiece is fitted in arrow direction A over the guide toothing 17 of the testing apparatus. The testpiece 1 moves an adjustment element 34 in the direction of the base body 10', e.g. by displacing a stop member 32 along the guide toothing 17 to which the adjustment element 34 is connected by a cross-rod 33. The stop member 32 has an abutment surface 32' which the testpiece engages. The base body 10' carries two measuring probes 35 which detect by means of electronic measurement the respective sliding position of the adjustment element 34. It is thus possible to establish the "measure between two balls" during the pushing of the testpiece 1 in arrow direction A onto the guide toothing 17; this displacement likewise taking place in longitudinal direction 18—18, at every point of the slide path with the aid of the inductive small measuring probes 19 and the measuring probes 35. The measuring probes 35 establish at what point of the slide path of the testpiece 1 in longitudinal direction 18—18 the "measure over two balls" is measured in each case. These measuring probes 35 preferably consist of similar small measuring probes as the small measuring probes 19 used to measure the "measure between two balls" (refer to FIGS. 4 and 5).

In the present embodiment, the adjustment element 34 is a sleeve which is fitted with conical grooves 36, the conical grooves 36 tapering slightly in the fitting and adjustment direction A. The measuring probes 35 are so provided with further measuring balls 37 in the displacement path of the conical grooves 36 that, when the further measuring balls 37 reach the face 38 of the sleeve 34 lying in the slide direction, the conical grooves 36 begin to shift the further measuring balls 37 radially outwards. At the end of this sliding movement, when the testpiece 1 is completely pushed over the guide toothing 17, the conical grooves 36 have pushed the further measuring balls 37 correspondingly further outwards in a radial direction, that is, towards the base part of the measuring probes 35. Reference is made to the description of FIGS. 4 and 5 for the inductive adjustment effect achieved. The measurement results of the small measuring probes 19 and 35 are coordinated with each other.

The sleeve 34 is displaced in displacement direction A against the action of a spring 39 housed in the base body 10'. After the ending of the measuring procedure and removal of the testpiece 1, the spring 39 restores the starting position shown in FIG. 6. This embodiment of the invention has the advantage that, with the aid of the electric measuring device, in particular the small measuring probes 35 in conjunction with the measuring probes 19, all the necessary measurements and functions are performed. All the measurement data is electrically detected and can thus be fed to displays and/or to an electronic data-processing unit.

Figure 7:
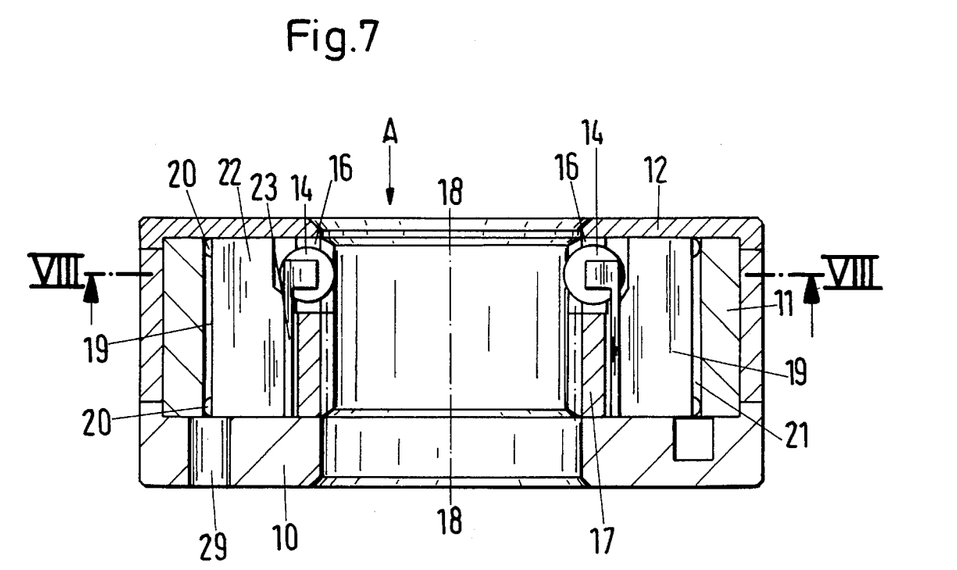
FIG. 7 illustrates in longitudinal section a testing apparatus in accordance with a further embodiment of the present invention for the measurement of an external toothing.
Figure 8:
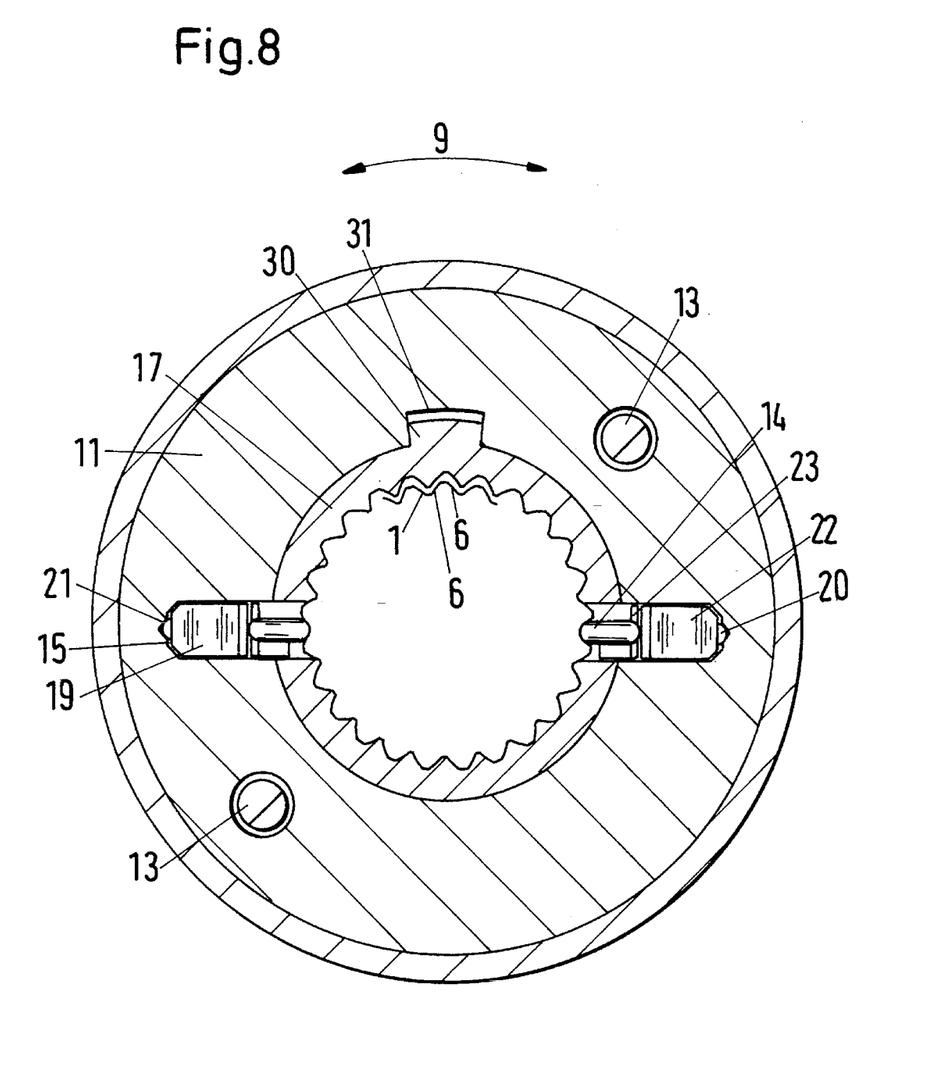
FIG. 8 illustrates a section along line VIII—VIII in FIG. 7.
Figure 9:
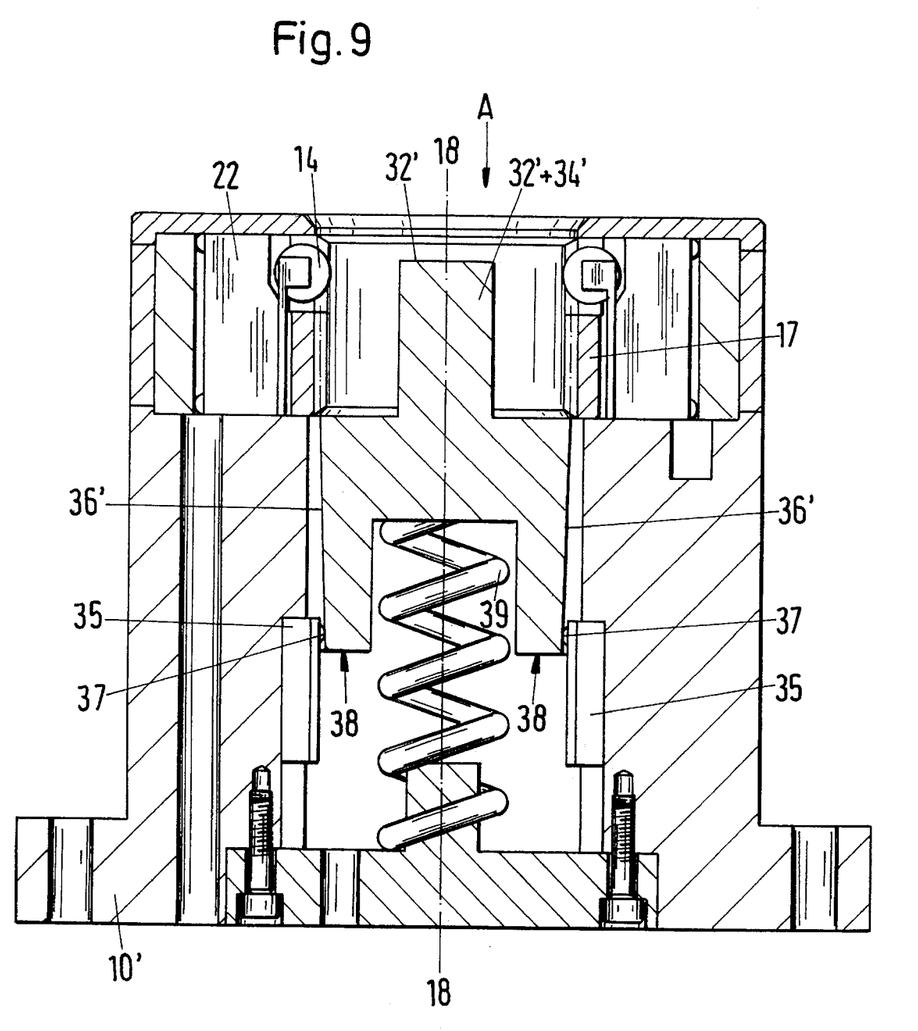
FIG. 9 illustrates a testing apparatus in accordance with a yet further embodiment of the present invention, this embodiment being a modification of that embodiment shown in FIGS. 7 and 8 to carry out longitudinal dynamic measurements.

Whereas, in the embodiment illustrated in FIGS. 2, 3 and 6 the guide toothing 17 in the form of a sleeve is to some extent designed as a mandrel over which the testpiece 1 having internal toothing can be fitted, in the embodiment illustrated in FIGS. 7 to 9 the toothing sleeve 17 is designed as a ring with toothing on the inside. The testpiece I having external toothing is fitted into the toothing sleeve 17 (indicated by dot-dash lines in FIG. 8). In other respects, the components used are the same as in the embodiment illustrated in to FIGS. 2, 3 and 6, and also FIGS. 4 and 5. This applies in particular to the inductive small measuring probes 19 and 35 which are housed in oscillating manner. Corresponding reference numbers are used for like parts in the embodiments illustrated in FIGS. 7 to 9 and FIGS. 2 to 6.

Figure 14:
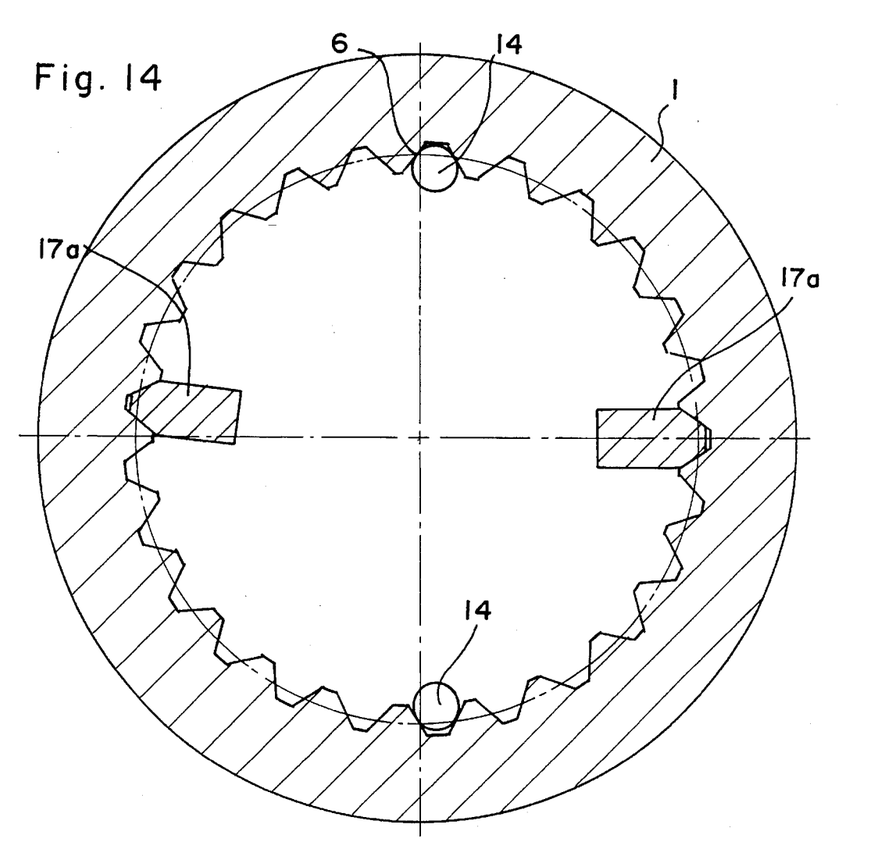
FIG. 14 illustrates a cross-section of a variation of the test piece and test device illustrated in FIG. 1.

For the sake of completeness, it should be pointed out that the toothing on the toothing sleeves need not be complete. Rather, a pin or cam is sufficient to ensure that the testpiece has the correct angle position relative to the test toothing in cross-section. See FIG. 8, discussed previously, and also FIG. 14, the latter illustrating the inclusion of pins or cams 17a in place of external toothing 4 shown in FIG. 1. Preferably, the toothing on the sleeve extends over its whole length without a flange or the like projecting on the front side, as this makes manufacture much simpler.

FIGS. 10 to 13a illustrate a further embodiment of the invention which provides for the automatic centring of the measuring balls and thus their symmetrical positioning in the tooth spaces, and the simultaneous measurement of the distances a between the two flanks 6 of the tooth spaces 7 of a testpiece. Reference is made initially to FIG. 1 and the associated description in this connection. The measuring balls 5 can be designed as measuring disks 14, which have the form of balls in their zone 14', and are introducible into the tooth spaces 7 and serve for measurement (see FIG. 13). In the following description, although only measuring balls may be mentioned, this term is intended to also cover the aforementioned measuring disks. In this embodiment, testpieces having internal toothing are measured. However, it will be understood that the principle of the present invention can also be provided in testing apparatuses in which a guide toothing sleeve having guide toothing on the inside is provided and testpieces with external toothing are tested (not shown in the drawing).

In FIGS. 10 to 13a and the associated description, parts which are identical or equivalent to the parts of the embodiments of FIGS. 2 to 9 are given the same reference numbers. It will also be understood that further features of the testing apparatus described in the embodiments illustrated in FIGS. 2 to 9 can be employed in the embodiments described hereinbelow, even though not shown or described in detail.

Figure 10:
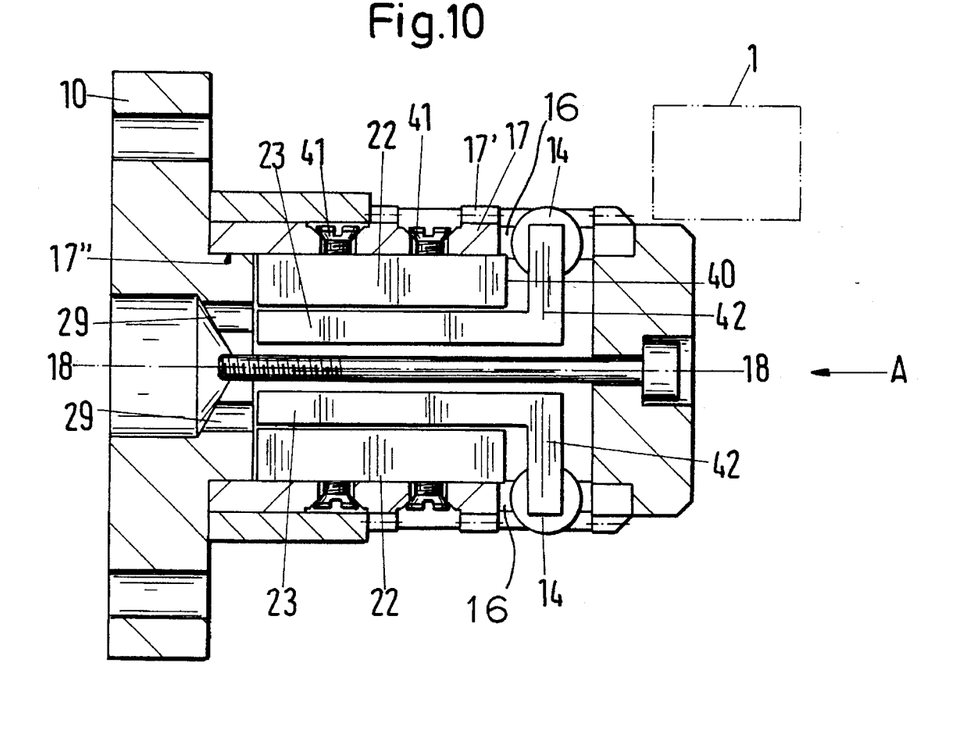
FIG. 10 illustrates a longitudinal section through a further embodiment of a testing apparatus in accordance with the present invention for the measurement of an internal toothing.

FIG. 10 shows in longitudinal section a testing apparatus in accordance with a further embodiment of the present invention. The testing apparatus has a toothing sleeve 17 with external guide toothing 17', over which the testpiece 1, only indicated by a dot-dash line, is pushed (guided) in direction A.

The small measuring probe consists of a base part 22 and a measuring part 23 whose means of connection to each other is explained in more detail with reference to FIGS. 11 to 13. The base part 22 is firmly attached to the inside 17" of the guide toothing sleeve 17. In this embodiment, two screws 41 serve for this purpose. Two small measuring probes are arranged diametrically opposite each other. The measuring part 23 possesses a measuring ball support 42, which is preferably an integral part thereof, and is located running past a face 40 of the base part 22. The measuring ball 14 is provided in a recess 16 of the guide toothing sleeve 17, in such a way that the measuring ball 14 can project outside this recess to the extent that the measuring ball 14 finds its place in the tooth space 7 by means of the rocking movement of the measuring part 23 relative to the base part 22.

The base part 22 is thus firmly attached to a stationary part of the toothing testing apparatus, extending in the longitudinal direction 18—18 of the testing apparatus which coincides with, or runs parallel to, the longitudinal direction of the toothing 17' of the guide sleeve 17 and also the slide direction A. The measuring part 23 is in each case connected to the base part 22 in such a way that it can describe a rocking movement relative to the base part as denoted by arrows 28. The measuring part 23 can also describe a swivel movement 41' relative to the base part 22 in a plane perpendicular to the plane of the rocking movement. In FIG. 12, that plane is located in or parallel to the plane of the drawing. With this arrangement, the function of the measurement principle of the invention is likewise achieved. However, by securing the base part 22 in stationary manner in the testing apparatus, the base part 22 cannot describe any movement relative to the testing apparatus. Through suitable development of the connection means 24 (to be explained in more detail below) between the measuring part 23 and base part 22, the explained rocking movement according to the double arrow 28 and thus a movement of the measuring ball 14 in the direction of the double arrow 27 relative to the tooth space 7 is made possible. In addition, the explained swivel movement in the direction of the double arrow 41' gives the measuring part 23 and thus the measuring ball 14 a certain lateral mobility in a circumferential direction 9 (see FIG. 1). That is, a "floating" arrangement, the effect of which is that the measuring ball 14 concerned enters the tooth space 7 to be measured and arranges itself centrally in the same, i.e., lies symmetrically against the two tooth flanks 6.

Figure 11:
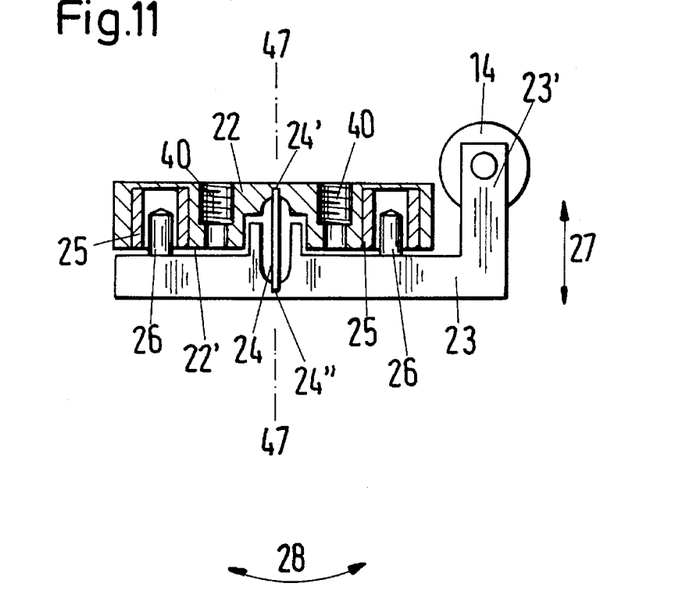
FIG. 11 illustrates a section through a small measuring probe which is represented diagrammatically in FIG. 10.
Figure 12:
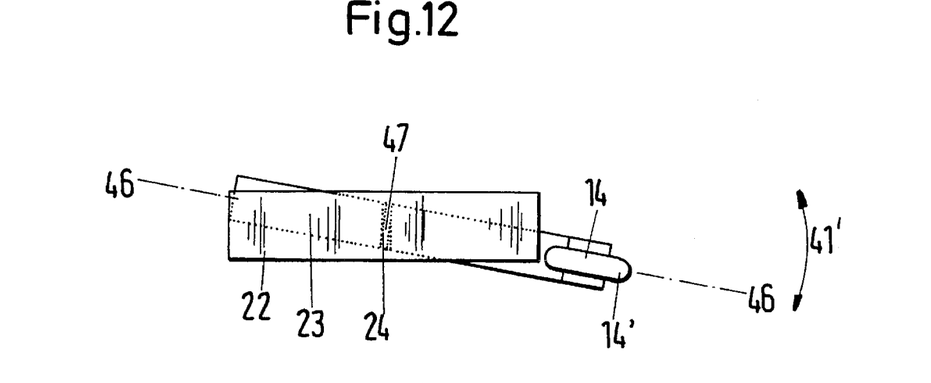
FIG. 12 illustrates a plan view of the measuring probe shown in FIG. 11.

FIG. 11 shows the attachment of the measuring part 23 to the base part 22 via a spring 24. The spring 24 is designed as a membrane which is mounted securely into the base part 22 at one end 24' and into the measuring part 23 at the other end 24". The membrane comprises an elastic material, preferably an elastic steel, which is both bendable in the arrow directions 28 and twistable in the arrow directions 41'.

Both movements can be performed simultaneously. The membrane preferably has two arms 43 which are fixed securely to the measuring part 23 by their front ends 24". A space 44 is left between the arms 43. In this way, the twistability of the membrane in the direction of the arrow 41' is made easy. On the other hand, however, an adequate width b of the membrane is created which facilitates and encourages the aforementioned tilting movement 28. FIG. 13 shows the membrane in an unloaded and untwisted configuration. Its longitudinal direction 45—45 runs parallel to the longitudinal direction 18—18 of the test apparatus and thus to the longitudinal direction of the base part 22. A twisting of the arms of the membrane in arrow direction 41' results in the longitudinal axis 46—46 of the measuring part 23 running at a corresponding angle to the aforementioned axis direction 45—45 or to axis direction 18—18.

FIG. 11 also shows the measuring coils 25 of the base part 22 and, located more or less deeply therein according to the rocking movement, magnet cores 26 of the measuring part 23.

This embodiment of the invention also encompasses a testing apparatus which has an inwardly directed guide toothing. In such an embodiment, the base part of the small measuring probe is securely attached to the outside of the guide toothing. The measuring part is connected in a rockable and swivellable manner to the outside of the base part as described hereinabove and is brought into the zone of the toothing of the testpiece via a measuring support arm with its measuring ball. It is also possible, in another embodiment of the present invention, to attach the base part of the small measuring probe securely to the outside of a central bearing body of the testing apparatus and provide the measuring part on the outside of the base part. The two last-mentioned alternative embodiments are not represented in the drawings.

Figure 13:
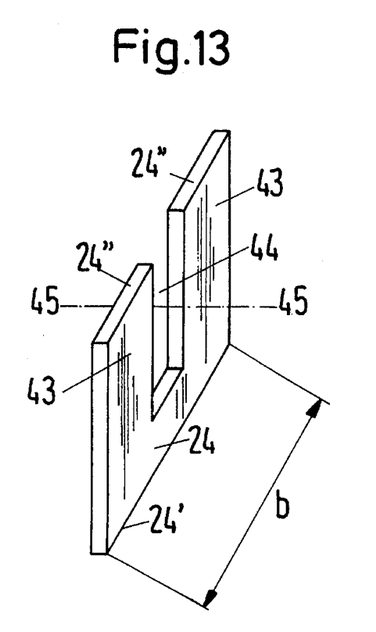
FIG. 13 illustrates an elastic connection between a measuring part and a base part of the small measuring probe in the at-rest position.
Figure 13A:
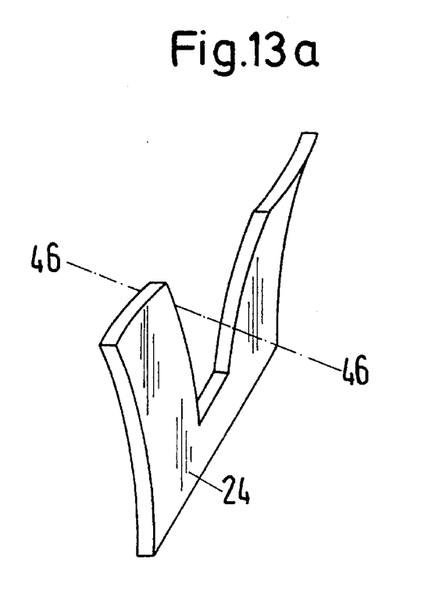
FIG. 13a illustrates the spring shown in FIG. 13 in twisted position.

Other forms of spring, for example a wire spring or wire springs corresponding to the arms 43 of FIGS. 13 and 13a, could be provided instead of the membrane spring used in the embodiment illustrated in FIGS. 11 to 13a.

The two arms 43 of the membrane spring arrangement 24 illustrated in FIG. 13 and also the two aforementioned wire springs lie in a plane which runs perpendicular to the plane of the base part 22. This plane of the base part 22 corresponds to the plane of the swivel movement 41'. In FIG. 12, this plane is located in the plane of the drawing, whereas in FIG. 11 one plane runs perpendicular to the plane of the drawing. On the other hand, the aforementioned axis 47—47 runs perpendicular to the plane of the drawing and thus to the base part 22 in FIG. 12. It is also located in the plane of the rocking movement. The axis 47—47 is preferably or expediently located in the centre of the base part 22, the measuring ball 14 attached to an end zone of the measuring part thus being a corresponding distance from the axis 47—47.

I claim:

1. A toothing testing apparatus comprising: at least one pair of measuring members having a circular cross-section of a certain diameter arranged to be introduced into respective substantially diametrically opposed tooth spaces of a testpiece; a measuring probe for each of said measuring members, each measuring probe comprising a base part and a measuring part elastically secured to the base part and which is rockable in a rocking movement relative thereto, and arranged to measure the distance between the measuring members of said at least one pair, the measuring part of one of said measuring probes having one of the measuring members attached thereto and the base part of said one of said measuring probes being attached to a stationary part of the testing apparatus; means for symmetrically positioning and automatically centering the measuring members of said at least one pair in the tooth spaces to be measured; and means for electrically measuring a depth of penetration of the measuring members into the tooth spaces.

2. A testing apparatus according to claim 1, wherein the electrical measurement means includes an inductive measurement arrangement made up of a coil and a magnet core, one of which is fixed relative to the base part of said one of said measuring probes and the other of which is moveable with the measuring member, the relative position between the coil and magnet thereby indicating the position of the measuring member relative to the stationary part.

3. A testing apparatus according to claim 1, wherein the base part of said one of said measuring probes is housed, oscillatingly about an axis which runs parallel to a longitudinal axis of the testing apparatus.

4. A testing apparatus according to claim 1, wherein the base part of said one of said measuring probes of each measuring probe has, at a base surface which rests on the stationary part, two projections, said projections lying one behind the other in a direction parallel to a longitudinal axis of the testing apparatus and at a predetermined distance from each other.

5. A testing apparatus according to claim 4, wherein the projections are in the form of balls.

6. A testing apparatus according to claim 4, wherein the two projections of each measuring probe engage the stationary part in a bearing channel which is formed in the center of a base of a respective recess running in the longitudinal direction of the stationary part.

7. A testing apparatus according to claim 1, wherein the base part of said one of said measuring probes is firmly attached to the testing apparatus, and the measuring part of said one of said measuring probes, in addition to said rocking movement, is swivellable about an axis relative to the base part of said one of said measuring probes located in the plane of the rocking movement which runs substantially perpendicular to the longitudinal direction of the base part of said one of said measuring probes.

8. A testing apparatus according to claim 7, wherein the base part of said one of said measuring probes is firmly attached to a guide toothing sleeve having a guide toothing.

9. A testing apparatus according to claim 8, wherein the guide toothing is held between a centering disk and a base body are combined to form a unit and held by a screw coupling.

10. A testing apparatus according to claim 8, wherein the guide toothing sleeve has outwardly directed guide toothing, the base part of said one of said measuring probes being located on the inside of the guide toothing sleeve and the measuring part of said one of said measuring probes being articulated in rockable and swivellable manner to an inside of the base part of said one of said measuring probes.

11. A testing apparatus according to claim 8, wherein the measuring part of said one of said measuring probes has a measuring member support which runs laterally alongside a face of the base part of said one of said measuring probes and projects with the measuring member into a recess of the guide toothing sleeve.

12. A testing apparatus according to claim 8, wherein the guide toothing sleeve has inwardly directed guide toothing, the base part of said one of said measuring probes being located on the outside of the guide toothing sleeve and the measuring part of said one of said measuring probes being articulated in rockable and swivellable manner to an outside of the base part of said one of said measuring probes.

13. A testing apparatus according to claim 7, wherein the base part of said one of said measuring probes is firmly attached to the outside of a central bearing body of the testing apparatus and the measuring part of said one of said measuring probes is located, articulated in rockable and swivellable manner, to the outside of the base part of said one of said measuring probes.

14. A testing apparatus according to claim 7, wherein the measuring part of said one of said measuring probes is articulated to the base part of said one of said measuring probes via a spring arrangement which is elastically bendable, both in the plane of rocking movement and in a swivel direction relative to the base part of said one of said measuring probes, the swivel direction running in a plane of the base part of said one of said measuring probes about an axis perpendicular to a plane of the base part of said one of said measuring probes.

15. A testing apparatus according to claim 14, wherein the axis of the swivel movement is located in the center of the measuring probe and the measuring part is arranged in the end zone of the associated measuring part of said one of said measuring probes at a distance from the swivel axis.

16. A testing apparatus according to claim 14, wherein the spring is a membrane-type leaf spring.

17. A testing apparatus according to claim 16, wherein the membrane-type leaf spring has two arms between which there is a gap.

18. A testing apparatus according to claim 1, wherein a guide toothing is provided whose tooth direction runs in a longitudinal direction of the testing apparatus, to permit the testpiece to be fitted in the longitudinal direction relative to the guide toothing, the guide toothing having two diametrically opposed openings for the accommodation and throughpassage of said at least one pair of measuring members.

19. A testing apparatus according to claim 18, wherein the guide toothing and the stationary part are centered relative to each other by a spring and a groove running in the longitudinal direction.

20. A testing apparatus according to claim 18, further comprising an adjustment element displaceable by the testpiece in a fitting-on direction in which the testpiece is positioned relative to the guide toothing, the fitting-on direction being parallel to the longitudinal axis of the testing apparatus, and there being provided subsequent to the adjustment element electrical measuring devices which, given a corresponding slide position of the adjustment element, are actuated by the latter, and with which the displacement position of the testpiece relative to the guide toothing is ascertainable.

21. A testing apparatus according to claim 20, wherein the adjustment element comprises a sleeve with cone grooves tapering slightly conically in the fitting-on direction, and the electrical measuring devices comprise two further measuring probes, each of which have a further rocker and a further measuring member, wherein the further measuring probes, considered in the fitting-on direction, are located behind the sleeve and are so positioned in radial direction perpendicular to the longitudinal axis that the further rockers with the further measuring members of each further measuring probe come to rest against the cone grooves of the adjustment element.

22. A testing apparatus according to claim 20, further comprising a stop member, the stop member having an abutment surface for the testpiece to be fitted over such that, when the testpiece is fitted on the adjustment element in the fitting-on direction, the testpiece is engaged by the abutment surface and shifted in the direction of the electrical measuring devices.

23. A testing apparatus according to claim 20, wherein the adjustment element rests in the fitting-on direction via a pressure spring at the base body of the testing apparatus.

24. A testing apparatus according to claim 18, wherein instead of a complete toothing, the guide toothing has elements which form a guide for the testpiece.

25. A testing apparatus according to claim 1, wherein a plurality of pairs of substantially diametrically opposed measuring members are arranged on a cross-sectional plane perpendicular to the longitudinal axis of the testing apparatus, the pairs being offset relative to each other by a specific angle in the circumferential direction of the testing apparatus in the cross-sectional plane.

26. A testing apparatus according to claim 25, wherein the base part of said one of said measuring probes of each measuring probe is arranged and housed in a recess in the stationary part running parallel to the longitudinal axis of the testing apparatus.

27. A testing apparatus according to claim 26, wherein each recess is a continuous groove over the entire length of the stationary part.

28. A testing apparatus according to claim 1, wherein the measuring part of said one of said measuring probes is designed as a rocker and is attached to the base part of said one of said measuring probes via an elastic housing.

29. A testing apparatus according to claim 1, wherein the testing apparatus has openings for the guiding through of electrical lines from the measuring probes to a measuring or evaluating arrangement.

30. A testing apparatus according to claim 1, wherein the stationary part is a bearing body.

* * * * *